Feb. 26, 1935.  J. D. GRABILL  1,992,369
FRUIT PICKER'S BAG
Filed Jan. 30, 1934   2 Sheets-Sheet 1
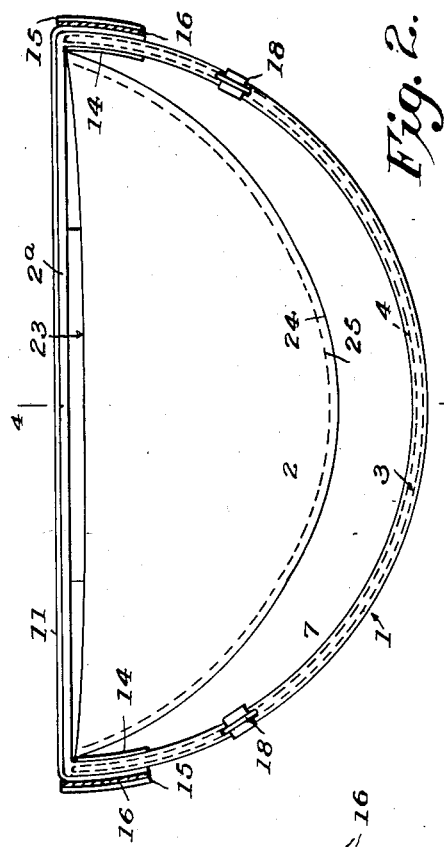
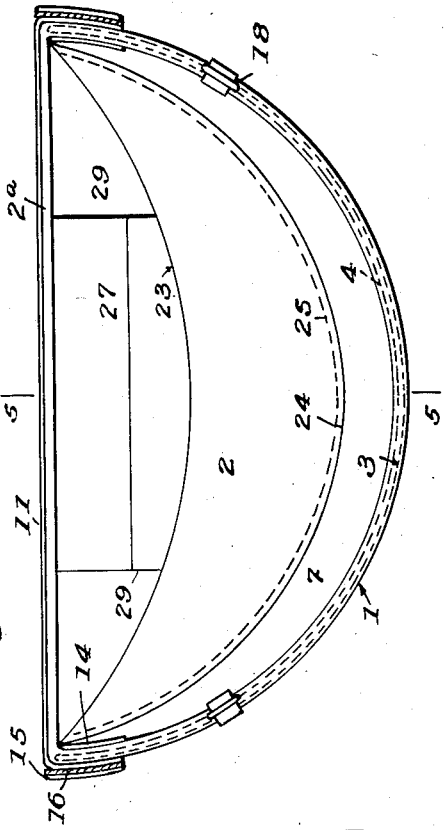
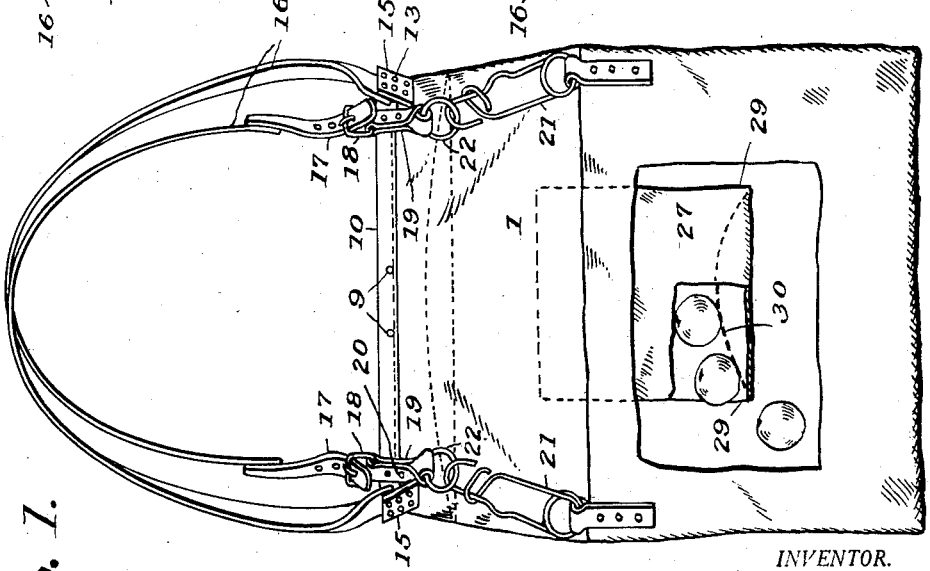
INVENTOR.
John D. Grabill.
BY
Milans & Milans
ATTORNEYS.

Feb. 26, 1935.  J. D. GRABILL  1,992,369
FRUIT PICKER'S BAG
Filed Jan. 30, 1934    2 Sheets-Sheet 2
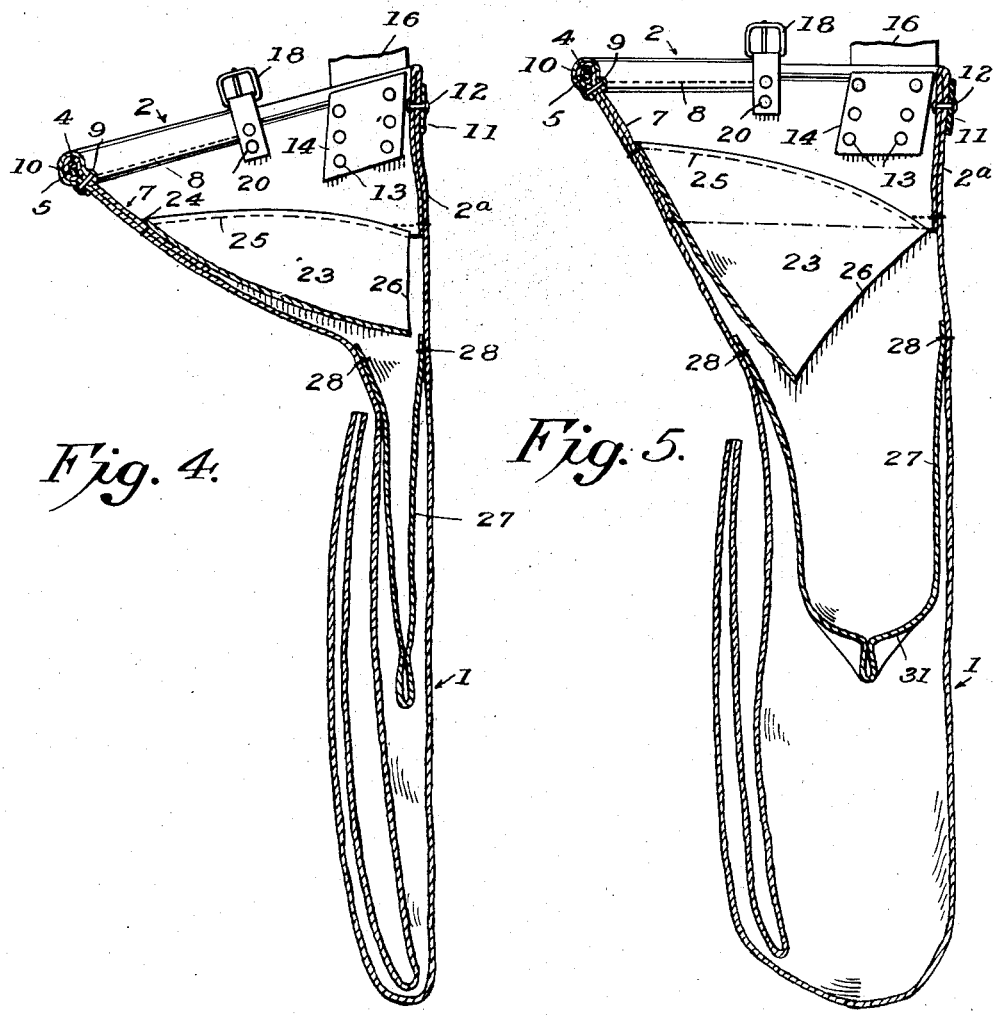
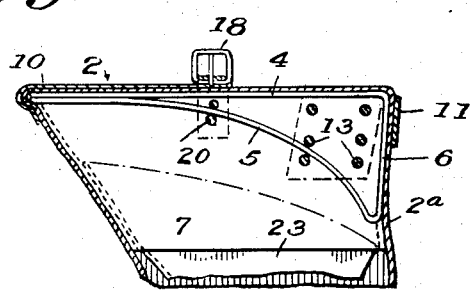
INVENTOR.
JOHN D. GRABILL
BY
Milans & Milans
ATTORNEYS.

Patented Feb. 26, 1935

1,992,369

UNITED STATES PATENT OFFICE 1,992,369

FRUIT PICKER'S BAG

John D. Grabill, Woodstock, Va.

Application January 30, 1934, Serial No. 709,006

5 Claims. (Cl. 150—2)

This invention relates to improvements in bags for use by fruit pickers.

The primary object of the invention is to provide an improved fruit picker's bag adapted to prevent bruising and injury to the fruit.

Another object of the invention is to provide an improved fruit picker's bag that will be effective in preventing damage to the fruit, and that will be simple in construction, strong and durable, and convenient in use.

An important novel characteristic of the invention resides in the special partition member provided in the upper part of the bag adapted to form with the upper portion of the bag a relatively shallow receptacle, and which when the front side of the mouth of the bag is raised substantially level with the rear side thereof, will be moved to occupy a position spaced from a wall of the bag to permit fruit to pass by the same.

Another important novel feature of the invention lies in the special construction of baffle provided in conjunction with the partition member in the upper part of the bag to break the fall of the fruit and prevent bruising.

The invention, with other objects, advantages, and novel features thereof, and the particular construction, combination and arrangements of parts comprising the same, will be understood from the hereinafter contained detailed description, when considered in connection with the accompanying drawings forming part hereof, and illustrating one embodiment of the invention.

In the drawings:

Figure 1 is a front elevation of a bag constructed in accordance with the present invention, a portion of the front wall of the bag being shown broken away.

Fig. 2 is a top plan view, on an enlarged scale, with the partition member in the upper part of the bag in position to form a shallow receptacle.

Fig. 3 is a similar view, the partition member being shown in position to permit fruit to pass by the same.

Fig. 4 is a vertical section on the line 4—4 of Figure 2.

Fig. 5 is a vertical section on the line 5—5 of Figure 3.

Fig. 6 is a fragmentary transverse section through the upper portion of the bag.

While a specific embodiment of the invention is illustrated in the drawings, it will of course be understood that minor changes and modifications may be made in the particular construction shown, and the invention may be embodied in other forms, as will appeal to those skilled in the art and falling within the scope of the appended claims, without departing from the spirit of the invention.

Referring to a detailed description of the particular embodiment of the invention illustrated in the drawings, the bag comprises a tubular body 1 made of canvas or any other suitable material and open at its upper and lower ends. Extending around the front side and ends of the mouth 2 of the bag is a substantially semi-circular shaped frame 3, which is shown as comprising two curved rod sections 4, 5, arranged close together in superposed relation, the lower rod section 5 at its end portions diverging downwardly from the upper rod section 4, and said sections being connected at their ends by straight portions 6. The frame 3, which is constructed of spring metal and normally tends to expand, is arranged under tension in a hem 7. The frame is secured in position in the hem 7 at the front side thereof by stitching 8 and rivets 9, passing through marginal portions of a reinforcing strip 10 of leather or the like and through the folds of the hem. The mouth 2 of the bag is reinforced at its rear side $2^a$ by a strip 11 of heavy canvas or other suitable material. This strip 11 is secured to the rear side of the mouth portion of the bag by rivets 12 and has its end portions turned over and secured to the ends of the mouth portion of the bag and to the ends of the frame 3 by rivets 13 and inner and outer reinforcing pieces 14, 15, of leather or similar material.

Shoulder bands 16 are each secured at one end to the ends of frame 3 and the adjoining end portions of the bag by rivets 13, end portions of the shoulder bands being interposed between the ends of the reinforcing strip 11 and the outer reinforcing pieces 15. The shoulder bands are provided at their other ends with strap portions 17 adapted to engage buckles 18 connected by leather loops 19 to the upper ends of the bag, the loops being secured to the frame by rivets 20.

Attached to the lower end of the bag are hooks 21 adapted to be engaged with rings 22 connected to the frame 3 to hold the lower end portion of the bag folded to close the same.

Arranged in the upper portion of the bag is a partition member 23 of canvas or similar material. This partition member is substantially segmental shape and is secured along its curved edge portion 24 to the front and end walls of the bag by stitching 25, the curved marginal edge portion 24 of the partition member extending substantially to the rear wall $2^a$ of the bag. The front side of the mouth portion of the bag normally hangs at a downward inclination relatively to the rear side thereof, as illustrated in Figure 4 of the drawings, and with the front side of the mouth of the bag in this position, the partition member 23 extends, as shown, across the upper portion of the bag and forms therewith a relatively shallow receptacle. When the front side of the mouth portion is swung outwardly and upwardly substantially level with the rear side thereof, as shown in Figure 5, the rear edge portion 26 of the partition member will be sufficiently spaced from the rear wall of the bag to permit fruit to pass therebetween from the partition member.

It will be noted that the resilient frame 3 terminating at the rear wall of the mouth portion of the bag, and the connection of the ends of the frame to the rear wall and to each other through the flexible strip 11 affords a simple, strong, durable construction for supporting the mouth of the bag, and is especially advantageous as employed in conjunction with the partition member 23, the same providing for the raising and lowering of the front side of the mouth portion of the bag relatively to the rear side thereof to effect changes in the position of the partition member relatively to the rear wall of the bag.

Disposed below the partition member 23 is a baffle 27 of loop formation constructed from a strip of flexible material, canvas or the like, secured at its end portions by stitches 28 to opposite sides of the bag. As shown in Figure 1 of the drawings, the width of the strip that forms the baffle, is less than the width of the front and rear walls of the bag and is located centrally thereof, the side edge portions 29 of the baffle being sufficiently spaced from the end walls of the bag to permit the passage of fruit therebetween. At the lower end of the baffle, wall portions of the strip forming the same are gathered together by a curved line of stitching 30 to provide a bottom wall 31 convex at its upper side, sloping downwardly from its middle towards its ends.

As will be understood, in the use of the device, when the relatively shallow receptacle formed by the partition member 23 has been filled with fruit, the front side of the mouth of the bag is pulled upwardly and outwardly to move the rear marginal portion of the partition member away from the rear wall of the bag to permit the fruit to pass therefrom between the rear marginal portion thereof and the rear wall of the bag. The fruit passing from the partition member 23 drops upon the baffle 27 which breaks the fall of the fruit, part of the fruit passing to one side of the baffle, and part to the other side thereof, the baffle serving to retard the movement of the fruit and also to spread the same evenly in the lower portion of the bag. As the bag fills, the partition member 23 folds close alongside the front side of the bag entirely out of the way. When the bag is to be emptied, the hooks 21 are disengaged from the rings 22, permitting the lower end of the bag to unfold.

The particular construction of bag hereinbefore set forth has been found in practice to be highly satisfactory. The partition member providing a relatively shallow receptacle in the upper portion of the bag and easily positioned by a simple outward movement of the front portion of the mouth of the bag to permit fruit to pass by the same, as will be appreciated, has important advantages, and the particular construction of baffle also is especially effective in preventing bruising or damage to the fruit. The particular construction is of a simple nature, strong and durable, and convenient in use.

What I claim is:

1. A fruit picker's bag having a frame secured about the front side and ends of the mouth thereof, means for supporting the bag from the shoulders of the wearer with the front side of its mouth inclined downwardly relatively to its rear side, and a partition member of flexible material in the upper portion of the bag secured to the front side and ends thereof, said partition member normally extending across the bag to form with the upper portion thereof a relatively shallow receptacle, and said partition member being spaced from the rear side of the bag to provide a passage for fruit past the same when the front side of the mouth portion of the bag is raised relatively to the rear side thereof.

2. A fruit picker's bag having a frame secured about the front side and ends of the mouth thereof, means for supporting the bag from the shoulders of the wearer with the front side of its mouth portion inclined downwardly relatively to the rear side thereof, a partition member of flexible material in the upper portion of the bag secured to the front side thereof, said partition member normally extending across the bag to form with the upper portion thereof a relatively shallow receptacle, said partition member being spaced from the rear side of the bag to provide a passage for fruit past the same when the front side of the bag is raised relatively to the rear side thereof, and a baffle of loop formation of flexible material below said partition member secured to the front and rear side walls of the bag and extending from front to rear substantially centrally of the ends of the partition member, said baffle having depending side walls of substantial length and a bottom wall spaced at its side edges from the ends of the bag to permit fruit to pass by the same, and said bottom wall sloping downwardly from its middle toward its side edges.

3. A fruit picker's bag having a substantially semi-circular shaped frame secured about the front side and ends of its mouth portion, means for supporting the bag from the shoulders of the wearer with the front side of its mouth downwardly inclined relatively to the rear side thereof, and a segmental shaped partition member of flexible material in the upper portion of the bag secured along its curved edge portion to the front side and ends of the bag, said partition member normally extending across the bag with its rear edge portion close to the rear side of the bag to form a relatively shallow receptacle in the upper portion of the bag, and said partition member being disposed with its rear edge portion spaced from the rear wall of the bag to provide a passage for fruit past the same when the front side of the mouth portion of the bag is raised relatively to the rear side thereof.

4. A fruit picker's bag having a substantially semi-circular shaped resilient frame secured under outward tension about the front side and ends of the mouth portion of the bag to hold the same distended, the ends of said frame terminating substantially at the inner ends of the ends of the mouth portion of the bag, a flexible strip connection between the ends of the frame, said strip connection extending along the rear side wall of the bag, shoulder engaging bands connected with the frame to support the bag with the front side of its mouth portion downwardly inclined relatively to the rear side thereof, and a segmental shaped partition member of flexible material in the upper portion of the bag secured along its curved edge portion to the front side and ends of the bag, said partition member normally extending across the bag with its rear edge portion close to the rear side of the bag to form a relatively shallow receptacle in the upper portion thereof, and said partition member being disposed with its rear edge portion spaced from the rear wall of the bag to provide a passage for fruit past the same when the front side of the mouth of the bag is raised from normal position relatively to the rear side thereof.

5. A fruit picker's bag having within the same a baffle of loop formation comprising a strip of flexible material secured at opposite ends to opposite sides of the bag, said baffle being spaced at its lower side edges from opposing walls of the bag to permit the passage of fruit past the lower side edges of the baffle, and the lower end portions of opposite sides of the baffle being gathered together by a curved line of stitching to provide a bottom wall convex longitudinally at its upper side.

JOHN D. GRABILL.